United States Patent [19]

Junkers

[11] Patent Number: 5,341,560
[45] Date of Patent: Aug. 30, 1994

[54] METHOD OF ELONGATING AND RELAXING A STUD

[76] Inventor: John K. Junkers, 7 Arrowhead La., Saddle River, N.J. 07540

[21] Appl. No.: 51,478

[22] Filed: Apr. 22, 1993

Related U.S. Application Data

[62] Division of Ser. No. 879,342, May 7, 1992.

[51] Int. Cl.$^5$ ............................................. B23P 11/02
[52] U.S. Cl. ..................................... 29/525.1; 411/432
[58] Field of Search ................... 29/525.1; 470/19; 403/22, 320; 73/761; 411/432, 433, 429, 434, 222, 226, 223, 190, 349, 237, 243, 244, 272, 292, 371, 368, 533, 534, 917, 263, 932, 264, 990

[56] References Cited

U.S. PATENT DOCUMENTS

| | | | |
|---|---|---|---|
| 443,117 | 12/1890 | Sharaf | 411/429 X |
| 794,781 | 7/1905 | Clausen | 411/918 X |
| 3,383,973 | 5/1968 | Gazal | 73/761 X |
| 3,435,777 | 4/1969 | Schaaf | 411/432 X |
| 3,565,472 | 2/1971 | Sjoholm | 403/22 |
| 5,137,408 | 8/1992 | Junkers | 411/432 |
| 5,152,649 | 10/1992 | Popp | 411/432 X |

FOREIGN PATENT DOCUMENTS

| | | | |
|---|---|---|---|
| 2696 | of 1880 | United Kingdom | 411/223 |
| 120642 | 11/1918 | United Kingdom | 411/223 |

Primary Examiner—Rodney M. Lindsey
Attorney, Agent, or Firm—Michael J. Striker

[57] ABSTRACT

A method of elongating and relaxing a stud having an axis and arranged in an object, includes the steps of connecting a stud with a first part which is movable only in an axial direction so as to pull the stud in the axial direction to elongate the stud and thereby to tension it in the object or to relax the stud, and moving the first part only in the axial direction by connecting the first part with a second part which is movable in a transverse direction, cooperating a friction element with at least one of the parts so as to change friction between the parts so that one of the parts has a higher friction than another of the parts and so that the second part is not connected with the friction element but instead is freely turnable relative to the friction element while freely abutting against the latter, and applying a force to at least one of the parts whereby the second part is moved in the transverse direction and the first part is moved only in the axial direction to move the stud in the axial direction so as to elongate the stud.

6 Claims, 1 Drawing Sheet

METHOD OF ELONGATING AND RELAXING A STUD

CROSS-REFERENCE TO A RELATED APPLICATION

This application is a division of patent application Ser. No. 879,342, filed on May 17, 1992.

BACKGROUND OF THE INVENTION

The present invention relates to a method of elongating and relaxing a stud arranged in an object, such as for example in a flange or the like.

Methods of the above mentioned general type are known in the art. For example, in order to elongate or relax a stud, a mechanical nut having two elements is utilized, and the elements are moved relative to one another in opposite axial directions to elongate the stud or to relax it. There are however many applications where no gaskets are used to seal the two flange portions or where the stud is oversized relative to the required clamping force. Therefore, with a steel-to-steel flange connection there is no compression feasible, and with an oversized stud there is no stud elongation feasible, and thus axial movement of one of the parts becomes possible.

SUMMARY OF THE INVENTION

Accordingly, it is an object of the present invention to provide a method of elongating and relaxing a stud, which is a further improvement of the prior art methods and which eliminates the disadvantages of the prior art methods.

In keeping with these objects and with others which will become apparent hereinafter, one feature of the present invention resides, briefly stated, in a method of elongating and relaxing a stud having an axis and arranged in an object, which includes connecting a stud with a first part which is movable only in an axial direction so as to pull the stud in the axial direction to elongate it and thereby to tension it in the object or to relax the stud, and moving the first part only in the axial direction by connecting with the first part a second part which is movable in a transverse direction, and cooperating by a friction element with at least one of the parts so as to change friction between the parts so that one of the parts has a higher friction than another of the parts and so that the second part is not connected with the friction element but is freely turnable relative to the friction element while freely abutting against the latter, and applying a force to at least one of the parts in a transverse direction to the axis whereby the second part is moved in the transverse direction and moves the first part only in the axial direction to move the stud in the axial direction so as to elongate the latter.

When the method is designed in accordance with the present invention it eliminates the disadvantages of the prior art and provides for further modification of the methods of elongating and relaxing a stud.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

The single FIGURE of the drawings is a view showing a cross-section of a mechanical tensioner for elongating and relaxing a stud in accordance with the method of the present invention.

DESCRIPTION OF THE PREFERRED EMBODIMENTS

Figure 1:
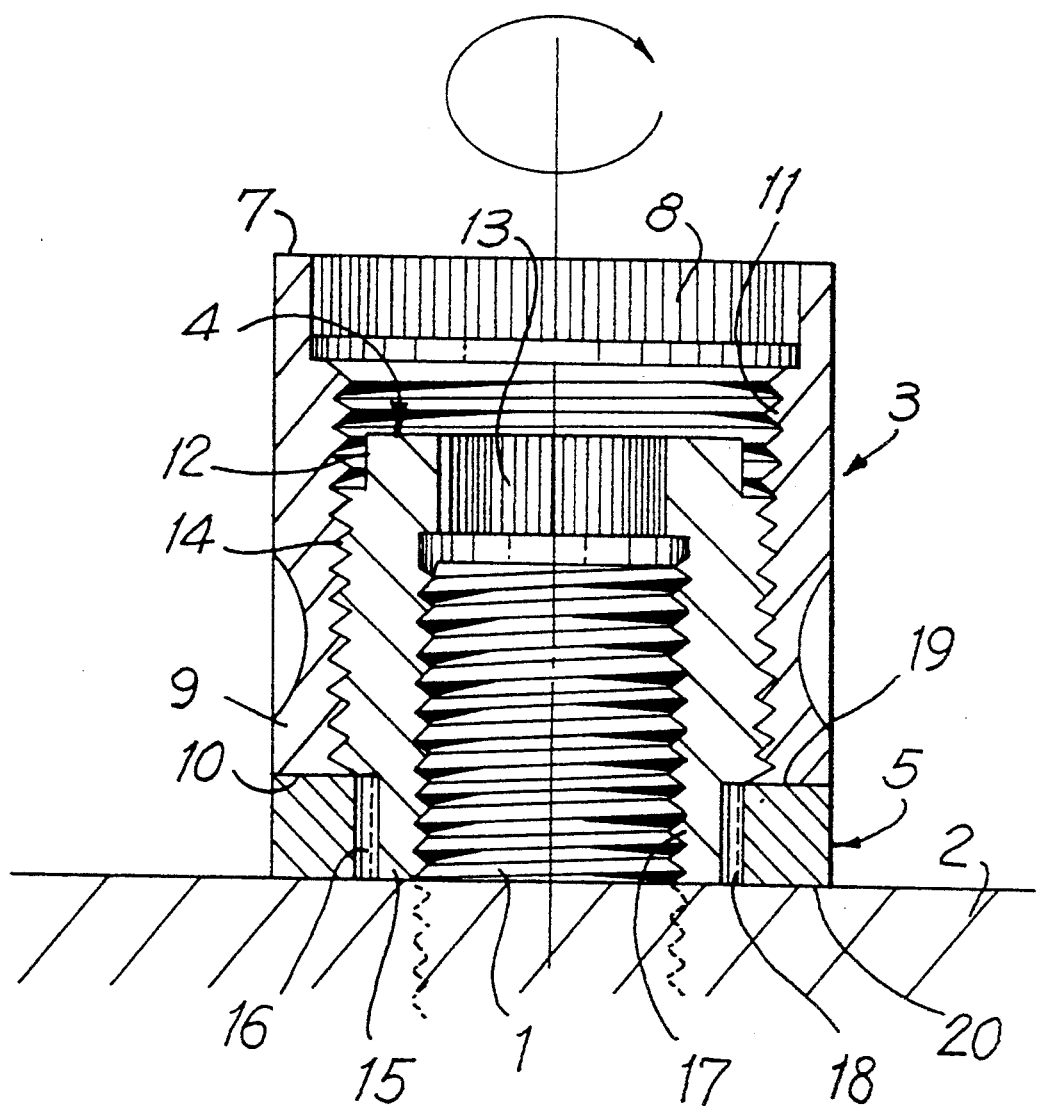

A method in accordance with the present invention is used for elongating and relaxing a stud 1 which is arranged in an outside object such as a flange 2 and the like. In accordance with the inventive method, the stud 1 is engaged by an inner part which is identified as a whole with reference numeral 4 and is movable only in an axial direction to pull the stud in the axial direction so as to elongate it and thereby to tension it in the object, or to relax the stud as will be explained hereinbelow. The inner part 4 is moved only in the axial direction by means of an outer part 3 which is connected with the inner part 4 and is movable in a transverse direction, and by means of a friction element 5 which cooperates with at least one of the parts 3 and 4 so as to change friction between the parts 3 and 4 as will be explained hereinbelow.

The outer part 3 has an end portion 7 facing away of the flange 2 and provided with engaging formations, for example splines 8, to be engaged by a tool. The outer part 3 also has a portion 9 which faces toward the flange 2 and has a surface 10 arranged to abut against the friction element 5. Finally, the outer part 3 has an inner thread 11. The outer part 3 can be formed as a tubular member provided with the above specified formations.

The inner part 4 has an end portion 12 which faces away of the flange 2 and is provided with a plurality of engaging formations, for example splines 13, to be engaged by a tool. It also has an outer surface provided with a thread 14 which engages with the thread 11 of the inner surface of the outer part 3. The inner part 4 has a portion 15 which is located inside the cooperating part 4 and has an outer surface provided with engaging formations, for example splines 16. Finally, the inner part 4 has an inner surface provided with engaging formations formed for example as an inner thread 17, for engaging with the stud 1. The inner part 4 is also formed as a tubular member.

The friction element is disc-shaped. It is to be located between the end portion 9 of the outer part 3 and the flange 2 on the one hand, and surrounds the portion 15 of the inner part 4 on the other hand. The friction element 5 has an inner surface 18 provided with a plurality of engaging formations, for example splines 18, which engage with the splines 16 of the portion 15 of the inner part 4. The friction element 5 has a surface 19 against which the surface 10 of the outer part 3 abuts, and also an opposite surface 20 which abuts against the outer surface of the flange 2.

The thread 11 of the outer part 3 and the thread 14 of the inner part 4 have one direction, while the thread 17 of the inner part 4 can have another direction. For example, the thread 17 can be a right-hand thread, while the threads 11 and 14 can be left-hand threads.

The connecting means 11, 14 connecting the inner part 4 with the outer part 3 is thread means, while the connecting means 16, 18 for connecting the inner part 4 with the friction element 15 can be spline means. These connecting means 11, 14 and 16, 18 are axially spaced from one another.

It can be said that the inner part 4 has four surfaces cooperating with other parts and subjectable to friction. In particular, it has the surface of the inner thread 17, the surface of the outer thread 14, the end surface abutting against the friction element 5, and the end surface abutting against the flange 2. In contrast, the outer part 3 has only two surfaces which are subjectable to friction, namely the surface of the inner thread 11, and the surface 19 abutting against the friction element 5.

In order to elongate or relax the stud in accordance with the inventive method, a tool is applied so that it engages the splines 8 of the outer part 3 to move the latter and also engages the splines 13 of the inner part so as to at least hold the part 4. When the outer part 3 is moved in a direction which is transverse to an axis of the tensioner and the stud, or more particularly is turned about this axis, its surface 10 abuts against the surface 19 of the friction element 5 and therefore the outer part 3 cannot move further onto the friction element 5 in the axial direction. Under the action of turning of the outer part 3 and due to the cooperation between the threads 11, 14, the inner part 4 is displaced in the axial direction, upwardly in the drawings, and at the same time does not displace in the transverse direction or in other words does not turn around the axis. During these movements the friction element 5 is neither displaced in the transverse direction (turned around the axis) nor in the axial direction. It is immovable relative to the flange 2. The axial upward displacement of the inner part 4 without the transverse displacement (turning around the axis) causes pulling of the stud 1 upwardly and therefore it is elongating.

Thus due to inventive cooperation of the parts 3 and 4 and the friction element 5 which imparts a higher friction to the inner part 4 than the outer part 3, when a force is applied to one of the parts 3, 4 in a transverse direction to the axis (by applying a force to one part, by holding one part and turning another part, by applying a turning force to both parts in opposite directions with equal forces), after elimination of the gaps in the assembly the outer part 3 moves in the transverse direction to the axis (rotates) while the inner part 4 moves only in the axial direction to pull the stud 1 upwardly in the axial direction.

It is to be understood that in order to relax the stud 1 the outer part 3 must be displaced in an opposite transverse direction (turned around the axis in an opposite direction), so that the inner part 4 is displaced axially downwardly and the stud is therefore relaxed.

It will be understood that each of the elements described above, or two or more together, may also find a useful application in other types of methods differing from the types described above.

While the invention has been illustrated and described as embodied in a method of elongating and relaxing a stud, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A method of elongating and relaxing a stud having an axis and arranged in an object, the method comprising the steps of connecting the stud with a first part which is movable only in an axial direction so as to pull the stud in the axial direction to elongate the stud and thereby to tension it in the object or to relax the stud; moving the first part only in the axial direction by connecting the first part with a second part which is moveable in a transverse direction; connecting a friction element with the first part, so that the first part has more surfaces cooperating with other elements and subjectable to friction during movement than the second part and so that the second part is not connected with the friction element but instead is freely turnable relative to the friction element while freely abutting against the friction element; and applying a holding force to the first part via first engaging means at an end portion of the first part spaced from the friction element and simultaneously applying an opposite active force to the second part via second engaging means whereby the second part is moved in the transverse direction and the first part is moved in the axial direction to move the stud in the axial direction without turning so as to elongate the stud.

2. A method as defined in claim 1, wherein the step of connecting the first part with the stud is performed by first thread means and the step of connecting the first part with the second part is performed by second thread means.

3. A method as defined in claim 1; and further comprising the step of arranging the friction element between the object and an end portion of the second part which faces the object so that the friction element surrounds an end portion of the first part which faces the object.

4. A method as defined in claim 1, wherein said step of applying an opposite force includes engaging the second part by a tool and moving the second part by the tool in the transverse direction.

5. A method as defined in claim 1, wherein said applying the holding force includes engaging the first part by a tool and holding the first part immovably in the transverse direction.

6. A method as defined in claim 1; and further comprising the step of providing first connecting means for connecting the first part with the second part so that the second part moves only in the transverse direction, and second connecting means axially spaced from the first connecting means and connecting the first part with the friction element so that the first part moves only in the axial direction.

* * * * *